(12) United States Patent
Fukuoka

(10) Patent No.: US 12,064,885 B2
(45) Date of Patent: Aug. 20, 2024

(54) ROBOT HAND CONTROLLER

(71) Applicant: DENSO WAVE INCORPORATED, Chita-gun (JP)

(72) Inventor: Takafumi Fukuoka, Chita-gun (JP)

(73) Assignee: DENSO WAVE INCORPORATED, Aichi-Pref (JP)

( * ) Notice: Subject to any disclaimer, the term of this patent is extended or adjusted under 35 U.S.C. 154(b) by 96 days.

(21) Appl. No.: 16/825,300

(22) Filed: Mar. 20, 2020

(65) Prior Publication Data

US 2020/0298410 A1 Sep. 24, 2020

(30) Foreign Application Priority Data

Mar. 22, 2019 (JP) ................................. 2019-055637

(51) Int. Cl.
 *B25J 9/16* (2006.01)
 *B25J 15/08* (2006.01)

(52) U.S. Cl.
 CPC ............ *B25J 9/1694* (2013.01); *B25J 15/08* (2013.01)

(58) Field of Classification Search
 CPC ........ B25J 9/1694; B25J 15/08; B25J 9/1612; B25J 9/1664; B25J 13/082; B25J 13/02; B25J 9/163; B25J 9/1633; B25J 13/088; B25J 13/085; B25J 15/083; B25J 9/0081; B25J 15/0433; B25J 13/083; G05B 19/42; G05B 19/425; G05B 13/0265; G05B 2219/36039; G06N 20/00
 See application file for complete search history.

(56) References Cited

U.S. PATENT DOCUMENTS

| | | | |
|---|---|---|---|
| 10,166,676 B1 * | 1/2019 | Hudson | B25J 9/1612 |
| 10,981,272 B1 * | 4/2021 | Nagarajan | B25J 9/1669 |
| 2015/0127151 A1 * | 5/2015 | Riedel | B25J 9/0081 |
| | | | 700/250 |
| 2015/0290809 A1 * | 10/2015 | Nakagawa | B25J 13/085 |
| | | | 700/258 |
| 2016/0059407 A1 * | 3/2016 | Sonoda | B25J 9/0081 |
| | | | 700/260 |
| 2019/0160666 A1 * | 5/2019 | Pollack | B25J 9/1664 |
| 2019/0308333 A1 * | 10/2019 | Chen | B25J 9/1612 |
| 2019/0329409 A1 * | 10/2019 | Yamada | B25J 9/1664 |
| 2020/0346347 A1 * | 11/2020 | Sankai | A61H 1/0274 |
| 2021/0213607 A1 * | 7/2021 | Sansfa on et al. | H02P 6/24 |

FOREIGN PATENT DOCUMENTS

JP 2007-136588 A 6/2007

* cited by examiner

*Primary Examiner* — Abby Y Lin
*Assistant Examiner* — Esvinder Singh
(74) *Attorney, Agent, or Firm* — IP & T GROUP LLP

(57) ABSTRACT

A robot hand controller is provided for controlling operations of a robot (e.g., an industrial robot), which is configured to be held with a position and posture of an arm being changed by a user, and a hand mounted on the arm and held with an open/closed position being changed by a user. In the controller, the position and posture of the arm and the open/closed position of the hand are detected. A gripping force of the hand is detected. A reception unit receives an operation of recording a state of the arm and the hand, and a recording unit records, as state information in time series, the position and the posture, the open/closed position, and the gripping force, which are detected when the operation is received by the reception unit. Operations of the arm and the hand are controlled to reproduce the recorded state information recorded in time series.

12 Claims, 5 Drawing Sheets

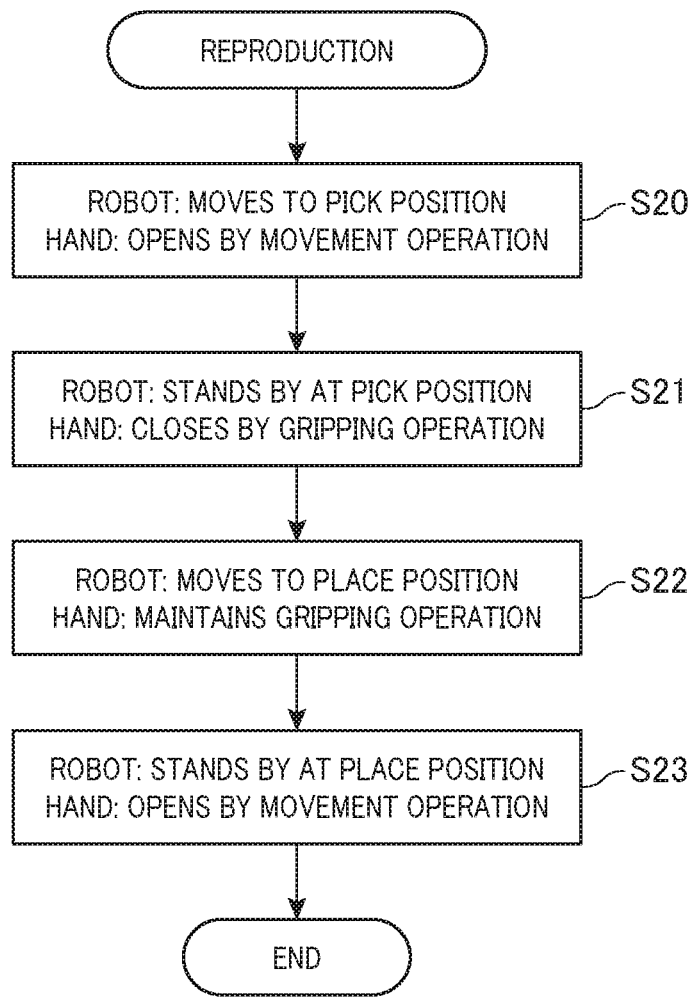

ROBOT HAND CONTROLLER

CROSS-REFERENCE TO RELATED APPLICATION

This application is based on and claims the benefit of priority from earlier Japanese Patent Application No. 2019-055637 filed Mar. 22, 2019, the description of which is incorporated herein by reference.

BACKGROUND

Technical Field

The present invention relates to a controller for controlling operations of a robot and a hand.

Related Art

There have been known controllers for controlling a robot arm. For example, in JP 2007-136588 A, a hand is fixed to the distal end of a robot arm via a force sensor so that a target position correction amount is generated based on the output from the force sensor, and the arm is controlled to move to a position obtained by adding the target position correction amount to a target position taught in advance.

In the controller disclosed in JP 2007-136588 A, the target position correction amount for the arm is generated based on the output from the force sensor. However, in order to teach an operation of the hand, it is necessary to input information such as a gripping force of the hand. For this reason, there is still a room for improvement in the controller disclosed in JP 2007-136588 A for facilitating the teaching of operations of the robot and the hand.

SUMMARY

It is thus desired to provide a robot hand controller that facilitates teaching of operations of a robot and a hand thereof.

According to a first exemplary embodiment for solving the above problem, a robot hand controller for controlling operations of a robot that is configured to be held with a position and a posture of an arm being changed by a user, and a hand that is mounted on the arm and configured to be held with an open/closed position being changed by a user, the controller includes: a first detecting unit that detects the position and the posture; a second detecting unit that detects the open/closed position; a third detecting unit that detects a gripping force of the hand; a reception unit that receives an operation of recording a state of the arm and the hand; a recording unit that records, as state information in time series, the position and the posture, the open/closed position, and the gripping force, which are detected by the first detecting unit, the second detecting unit, and the third detecting unit, respectively, when the operation is received by the reception unit; and a control unit that controls operations of the arm and the hand so as to reproduce the state information recorded in time series by the recording unit.

With this configuration, the robot can be held with the position and posture of the arm being changed by the user. Accordingly, the user can directly grasp and move the arm by direct teaching, can move the arm by operating an operation device, and can hold the position and posture of the arm. The hand is mounted on the arm, and the hand can be held with the open/closed position being changed by the user. Accordingly, the user can directly grasp and open/close the hand by direct teaching, can open/close the hand by operating an operation device, and can hold the open/closed position of the hand.

The first detecting unit detects a position and a posture of the arm, the second detecting unit detects an open/closed position of the hand, and the third detecting unit detects a gripping force of the hand. The reception unit receives an operation of recording a state of the arm and the hand. Accordingly, when the user performs an operation of recording a state of the arm and the hand, the operation is received by the reception unit. The recording unit records, as state information in time series, the position and the posture of the arm, the open/closed position of the hand, and the gripping force of the hand detected by the first detecting unit, the second detecting unit, and the third detecting unit, respectively, when the operation is received by the reception unit.

For example, the user can record the state information including the gripping force of the hand by causing the robot to perform an operation of gripping the workpiece with the hand and performing an operation of recording the state by using the reception unit. Then, the user can record the state information in time series by causing the arm to perform an operation of moving and performing an operation of recording the state. The control unit controls the operations of the arm and the hand so as to reproduce the state information recorded in time series by the recording unit. Therefore, even a user who does not have special skills can easily teach and reproduce the operations of the robot and the hand without the need of inputting the gripping force or the like of the hand.

In a gripping operation by which the workpiece is gripped by the hand, it is necessary to control the open/closed position of the hand and to grip the workpiece with an appropriate force. Whether or not the state information is the gripping operation being performed by the hand can be determined according to whether or not the gripping force is larger than a first force, which is a force for determining the gripping operation being performed by the hand. The first force is a force for determining that the hand is gripping the workpiece when the detected gripping force is larger than the first force.

According to a second exemplary embodiment, when the gripping force of the state information is larger than a first force, which is a force for determining a gripping operation being performed by the hand, the control unit reproduces the state information with priority to the gripping force over the open/closed position. Accordingly, in the case where the state information is the gripping operation of the hand, the hand can reliably grip the workpiece with an appropriate force even if the relationship between the workpiece and the open/closed position at the time of reproduction is deviated from the recorded state information.

Even in the case where the hand grips the workpiece, it is not necessary to adjust the gripping force before the hand comes into contact with the workpiece.

According to a third exemplary embodiment, when the gripping force of the state information is larger than a first force, which is a force for determining a gripping operation being performed by the hand, the control unit operates the hand at a highest speed to a position before the open/closed position by a predetermined distance in reproduction of the state information. Accordingly, even in the case where the hand grips the workpiece, the hand can be operated at a highest speed to a position before the open/closed position by a predetermined distance, the open/closed position being a position at which gripping operation ends, and thus the operation time can be reduced.

Even in the case where the open/closed position of the hand is controlled, it is not necessary to adjust the gripping force in a non-gripping operation (movement operation of the hand), by which the workpiece is not gripped by the hand. Whether or not the state information is the non-gripping operation being performed by the hand can be determined according to whether or not the gripping force is smaller than a second force, which is a force for determining the non-gripping operation being performed by the hand. The second force is a force for determining that the hand is not gripping the workpiece when the detected gripping force is smaller than the second force. For example, the second force is a force smaller than the first force, and may be a force slightly larger than 0.

According to a fourth exemplary embodiment, when the gripping force of the state information is smaller than a second force, which is a force for determining a non-gripping operation being performed by the hand, the control unit reproduces the open/closed position at a highest speed in reproduction of the state information. Accordingly, when the state information is the non-gripping operation of the hand, the open/closed position can be reproduced at the highest speed, and thus the operation time can be reduced. Further, in teaching of the operation of the hand, there is no need of setting the opening/closing speed of the hand.

An appropriate operation of the hand between two consecutive pieces of state information varies depending on the gripping forces of the two consecutive pieces of state information. For example, when first state information is a gripping operation and second state information following the first state information is also a gripping operation, it can be determined that the gripping operation should be maintained between the first state information and the second state information as well.

According to a fifth exemplary embodiment, the control unit controls an operation of the hand between two consecutive pieces of the state information based on the gripping forces of the two consecutive pieces of the state information. Accordingly, the operation of the hand between two consecutive pieces of state information can be appropriately controlled based on the gripping forces of the two consecutive pieces of state information.

According to a sixth exemplary embodiment, specifically, when the gripping forces of two consecutive pieces of the state information are larger than a first force, which is a force for determining a gripping operation being performed by the hand, the control unit may maintain a gripping operation as an operation of the hand between the two consecutive pieces of the state information.

According to a seventh exemplary embodiment, specifically, when the gripping forces of two consecutive pieces of the state information are smaller than a second force, which is a force for determining a non-gripping operation being performed by the hand, the control unit may maintain a non-gripping operation as an operation of the hand between the two consecutive pieces of the state information.

There may be a case where first state information is taught that the arm is separated from the workpiece and the hand is not gripping the workpiece, and second state information following the first state information is taught that the arm has moved to the workpiece and the hand is gripping the workpiece. In this case, if the hand which has moved from the position of the arm in the first state information closes before reaching the position of the arm in the second state information, the hand cannot grip the workpiece.

According to an eighth exemplary embodiment, when the gripping force in first state information is smaller than a second force, which is a force for determining a non-gripping operation being performed by the hand, and the gripping force in second state information following the first state information is larger than a first force, which is a force for determining a gripping operation being performed by the hand, the control unit reproduces the open/closed position and the gripping force after reproducing the position and the posture in reproduction of the second state information. Accordingly, even if a state in which the arm has moved to the workpiece and the hand is gripping the workpiece is taught after a state in which the arm is separated from the workpiece and the hand is not gripping the workpiece, the hand can grip the workpiece. Therefore, the number of pieces of state information (operation state) that are taught can be reduced, and thus teaching of operations of the robot and the hand can be further easily performed.

There may be a case where third state information is taught that the arm has moved to the workpiece and the hand is gripping the workpiece, and fourth state information following the third state information is taught that the arm has moved from the position in the third state information and the hand is not gripping the workpiece. In this case, if the hand which has moved from the position of the arm in the third state information opens before reaching the position of the arm in the fourth state information, the hand drops the workpiece and fails to transfer the workpiece to the position in the fourth state information.

According to a ninth exemplary embodiment, when the gripping force of third state information is larger than a first force, which is a force for determining a gripping operation being performed by the hand, and the gripping force of fourth state information following the third state information is smaller than a second force, which is a force for determining a non-gripping operation being performed by the hand, the control unit reproduces the open/closed position and the gripping force after reproducing the position and the posture in reproduction of the fourth state information. Accordingly, even if a state in which the workpiece has been moved and the hand has released the workpiece is taught after a state in which the hand is gripping the workpiece, the hand can be moved without dropping the workpiece. Therefore, the number of pieces of state information that are taught can be reduced, and thus teaching of operations of the robot and the hand can be further easily performed.

There may be a case where the hand fails to grip the workpiece depending on a position and an angle of the workpiece. In this case, even if the open/closed position of the hand in the state information is reproduced, the gripping force of the detected hand becomes smaller than the gripping force of the state information.

According to a tenth exemplary embodiment, when the gripping force detected by the third detecting unit in reproduction of the open/closed position of the state information is smaller than the gripping force of the state information by more than a predetermined degree, the control unit determines that the hand has failed to grip a workpiece. Accordingly, it can be determined that the hand has failed to grip the workpiece.

BRIEF DESCRIPTION OF THE DRAWINGS

In the accompanying drawings:

FIG. 7 is a flowchart showing a procedure for reproducing the taught operations.

DETAILED DESCRIPTION OF THE PREFERRED EMBODIMENTS

With reference to the drawings, an embodiment implemented as a controller for an articulated robot and a hand will be described.

Figure 1:
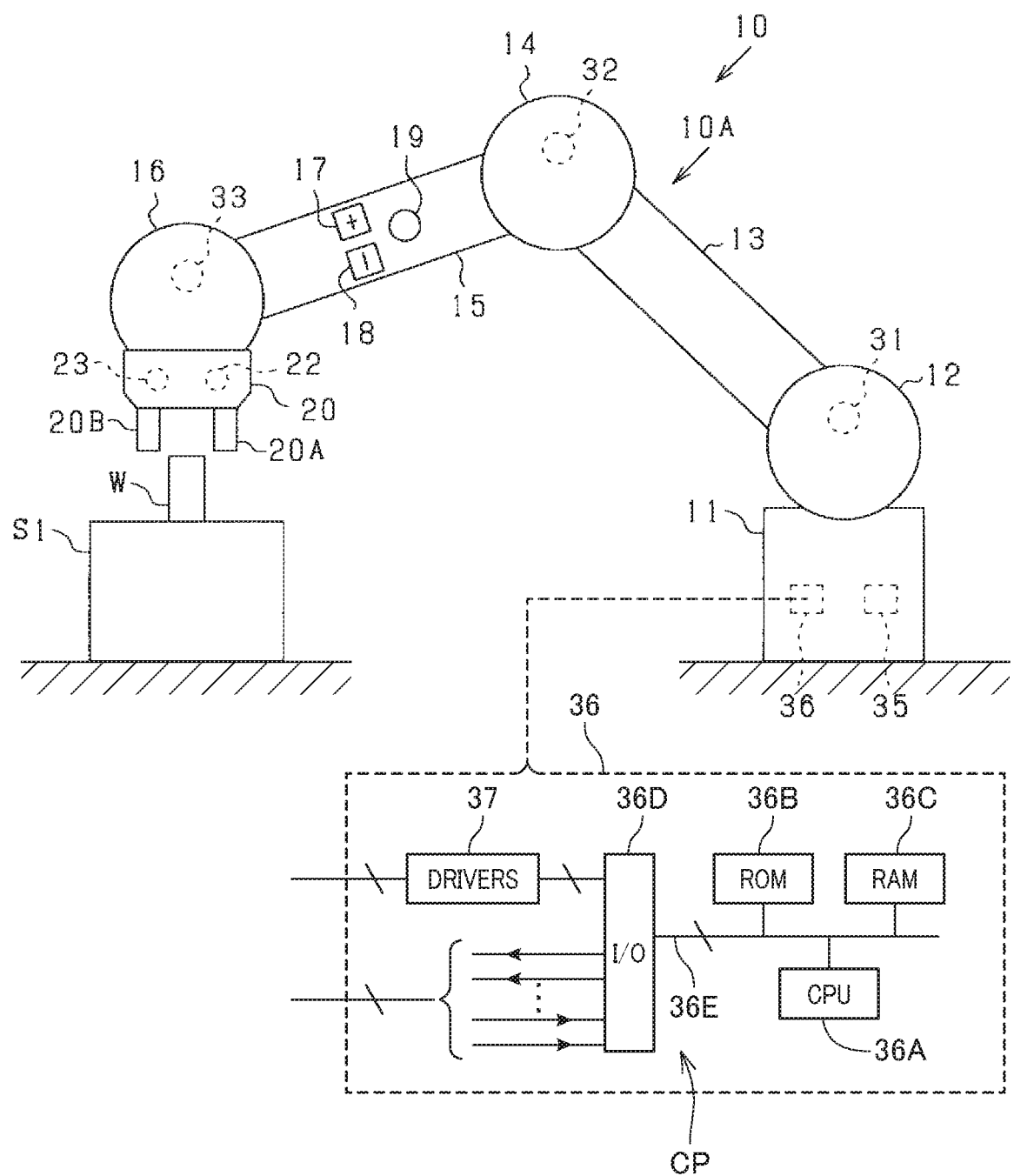
FIG. 1 is a schematic view illustrating a robot and a hand.

As shown in FIG. 1, a robot 10 is provided as an industrial robot which is, for example, a 6-axis vertical articulated robot, and includes a base 11 and an arm 10A. Adjacent links 13 and 15 (partially shown) of the arm 10A are joined by joints 12, 14, and 16 (partially shown) in sequence in a relatively rotatable manner. The joints 12, 14, and 16 are driven by motors (not shown) corresponding to the respective joint 12, 14, and 16.

A hand 20 is mounted on a distal end of the arm 10A. The hand 20 has a pair of claws (or claw portions) 20A and 20B, and performs open and close operations for widening and narrowing the interval between the claws 20A and 20B. The claws 20A and 20B are driven by a motor (not shown).

The base 11 includes therein a recording unit 35 for recording the states of the robot 10 and the hand 20, and a control unit 36 for controlling the operation of the robot 10 and the hand 20. The control unit 36 is configured as a computer including components such as a CPU, a ROM, a RAM, and an I/O interface.

Specifically, by way of example, the control unit 36 is provided with a computer system CP with a CPU (central processing unit) 36A, a ROM (read-only memory) 36B, a RAM (random access memory) 36C and an input/output interface 36D which are interconnected mutually communicably via a bus 35E. Various sensed signals are supplied to the CPU 36A through the input/output interface 36D and various commands and drive signals are outputted from the CPU 36A to the drivers 37 and not-shown other devices via the input/output interface 36D. The drivers 37 are provided to drive the motors arranged at the respective joints. The CPU 36A executes various robot control process by reading programs stored in advance in the ROM 36B and temporarily store the read programs in a specified work area for execution thereof. The CPU 36A is thus able to function as control means, while the ROM 36B functions as a non-transitory computer-readable recording medium in which source codes of steps of the preset control programs are previously stored. The RAM 36C is able to temporarily store data generated or needed during the execution of the programs by the CPU 36A. The foregoing computer configuration is just an example, and other configurations can be adopted as long as the preset computer programs can be performed. For instance, two or more CPUs can be used for decentralized control or redundant system. In addition, the CPU 36A is provided as an essential calculation component of the computer system, so that different types of calculation components can be used provided that such calculation components have equivalent calculational functions to the CPU 36A. The CPU 36A can be replaced by components called a MPU, a processor, or a calculator.

The link 15 of the robot 10 is provided with an open button 17 and a close button 18 for the hand 20, and a position recording button 19. The control unit 36 (i.e., the CPU 36A) performs an operation of opening the hand 20 at a first speed while the user presses the open button 17. The control unit 36 (i.e., the CPU 36A) performs an operation of closing the hand 20 at a second speed while the user presses the close button 18. The second speed may be the same as the first speed, or may be lower than the first speed. The control unit 36 (i.e., the CPU 36A) holds the hand 20 at an open/closed position at the time when the user stops pressing the open button 17 or the close button 18. That is, the hand 20 can be held with the open/closed position being changed by the user. The position recording button 19 will be described later.

For example, the joints 12, 14, and 16 of the robot 10 are provided with encoders 31, 32, and 33 for detecting a rotation angle of the joints 12, 14, and 16, respectively. That is, the encoders 31, 32, and 33 (first detecting unit) detect the position and posture of a control point of the arm 10A (hereinafter, referred to as a "position and posture of the arm 10A"). The control point is set at the center of the distal end of the arm 10A.

The hand 20 is provided with an encoder 22 (second detecting unit) for detecting an open/closed position of the hand 20. The hand 20 is further provided with a force sensor 23 for detecting a gripping force of the hand 20. The force sensor 23 (third detecting unit) may be a current sensor that detects a current flowing in a motor that drives the claws 20A and 20B, or a pressure sensor that detects a pressure acting on the claws 20A and 20B.

The control unit 36 (i.e., the CPU 36A) controls the position and posture of the arm 10A according to an external force acting on the arm 10A. The control unit 36 holds the position and posture of the arm 10A at the time when the external force stops acting on the arm 10A. That is, the robot 10 can be held with the position and posture of the arm 10A being changed by the user. In the present embodiment, the user can directly grasp and move the arm 10A by direct teaching, and can hold the position and posture of the arm 10A.

When the user presses the position recording button 19, the control unit 36 (i.e., the CPU 36A) causes the recording unit 35 to record the position and posture of the arm 10A, the open/closed position, gripping force, and gripping state of the hand 20 as the state information based on the detection results from the encoders 31, 32, and 33, the encoder 22, and the force sensor 23. The control unit 36 causes the recording unit 35 to record the state information in time series each time the user presses the position recording button 19. That is, the position recording button 19 (reception unit) receives an operation of recording the states of the arm 10A and the hand 20. When the position recording button 19 receives the operation, the recording unit 35 records the position and posture of the arm 10A, the open/closed position, gripping force, and gripping state of the hand 20, which are each detected by the encoders 31, 32, and 33, the encoder 22, and the force sensor 23, as the state information in time series. Accordingly, the user can teach the operations of the arm 10A and the hand 20 by repeating the movement of the arm 10A, the opening and closing of the hand 20, and the position recording.

The control unit 36 (i.e., the CPU 36A) determines the gripping state of the hand 20 based on the gripping force detected by the force sensor 23. Specifically, when the gripping force detected by the force sensor 23 is larger than a first force, which can be used to determine a gripping operation (gripping state) performed by the hand 20, it is determined that a gripping operation is performed. The first force is a force for determining that the hand 20 is gripping the workpiece W when the gripping force detected by the force sensor 23 is larger than the first force. On the other hand, when the gripping force detected by the force sensor 23 is smaller than a second force, which can be used to determine a non-gripping operation (non-gripping state) performed by the hand 20, it is determined that a non-gripping operation is performed. The second force is a force for determining that the hand 20 is not gripping the workpiece W when the gripping force detected by the force sensor 23 is smaller than the second force. For example, the second force is a force smaller than the first force, and may be a force slightly larger than 0.

The control unit 36 controls the operations of the arm 10A and the hand 20 so as to reproduce the state information recorded in time series by the recording unit 35. Accordingly, the user can cause the control unit 36 to reproduce the taught operations of the arm 10A and the hand 20. Thus, the user can perform a task on the workpiece W by using the robot 10. The robot and hand controller is composed of the encoders 31, 32, and 33 (functionally serving as a first detecting unit), the encoder 22 (functionally serving as a second detecting unit), the force sensor 23 (functionally serving as third detecting unit), the position recording button 19 (functionally serving as a reception unit), the recording unit 35, and the control unit 36.

Figure 2:
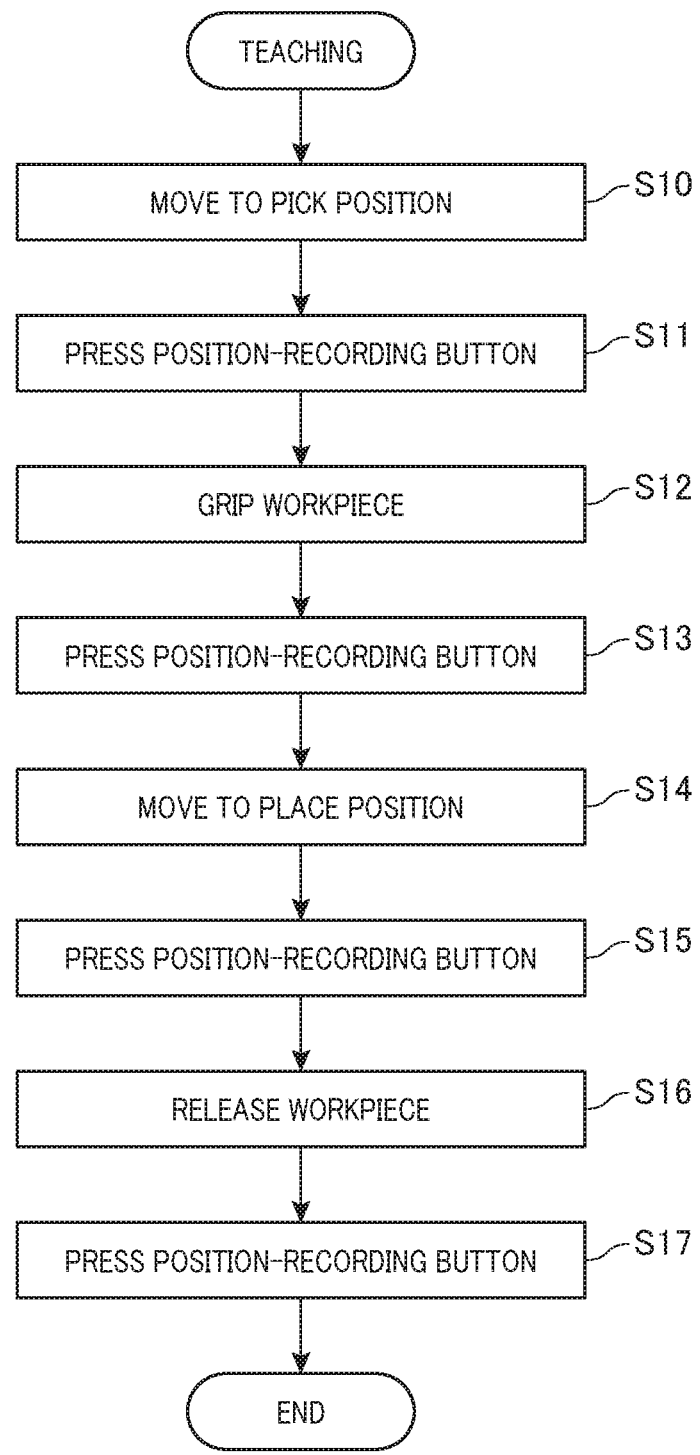
FIG. 2 is a flowchart showing a procedure for teaching operations.

FIG. 2 is a flowchart showing a procedure for teaching operations. This series of operations are performed by the user. With reference to FIGS. 3 to 6, a procedure for teaching operations of transferring the workpiece W from a work table S1 to a work table S2 and releasing the workpiece W on the work table S2 will be described.

Figure 3:
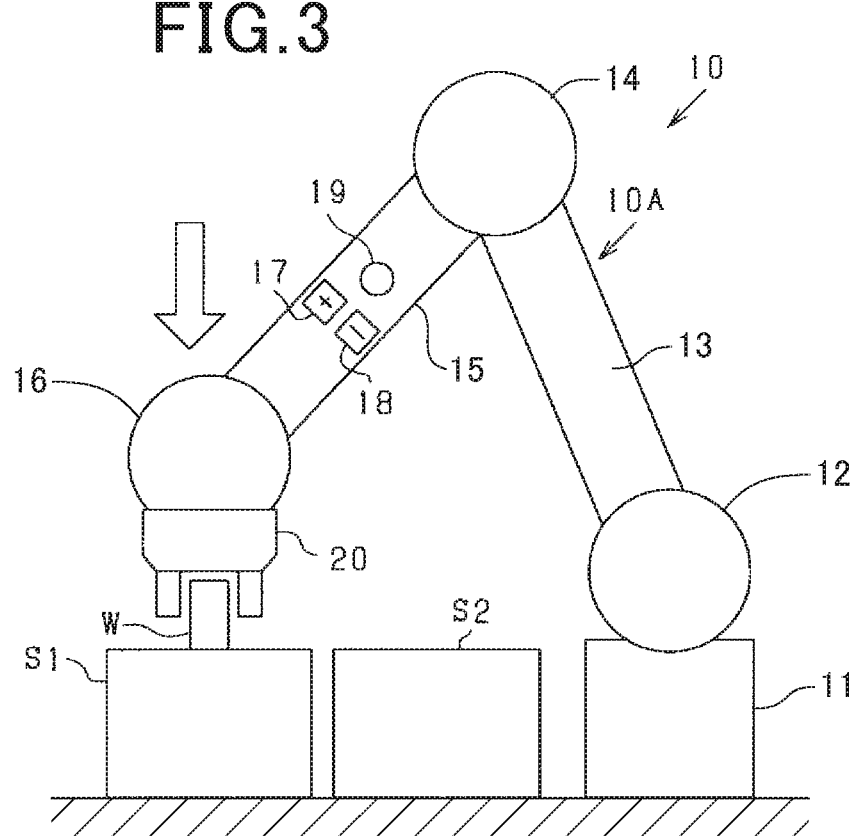
FIG. 3 is a schematic view illustrating a mode of moving to a pick position.

First, the arm 10A is moved to a pick position (position at which the workpiece W is picked) (step S10), Specifically, as shown in FIG. 3, the user directly grasps the arm 10A and moves it to the pick position by direct teaching. When the hand 20 is closed and narrower than the width of the workpiece W, the user presses the open button 17 to open the hand 20 wider than the width of the workpiece W.

Subsequently, the position recording button 19 is pressed (step S11). When the position recording button 19 is pressed by the user, the control unit 36 causes the recording unit 35 to record the position and posture of the arm 10A, the open/closed position, gripping force, and gripping state of the hand 20, which are each detected by the encoders 31, 32, and 33, the encoder 22, and the force sensor 23, as the state information. In FIG. 3, a pick position and a downward posture are recorded as the position and the posture of the arm 10A, an open/closed position opened wider than the width of the workpiece W is recorded as the open/closed position of the hand 20, 0 is recorded as the gripping force, and a non-gripping operation is recorded as the gripping state.

Figure 4:
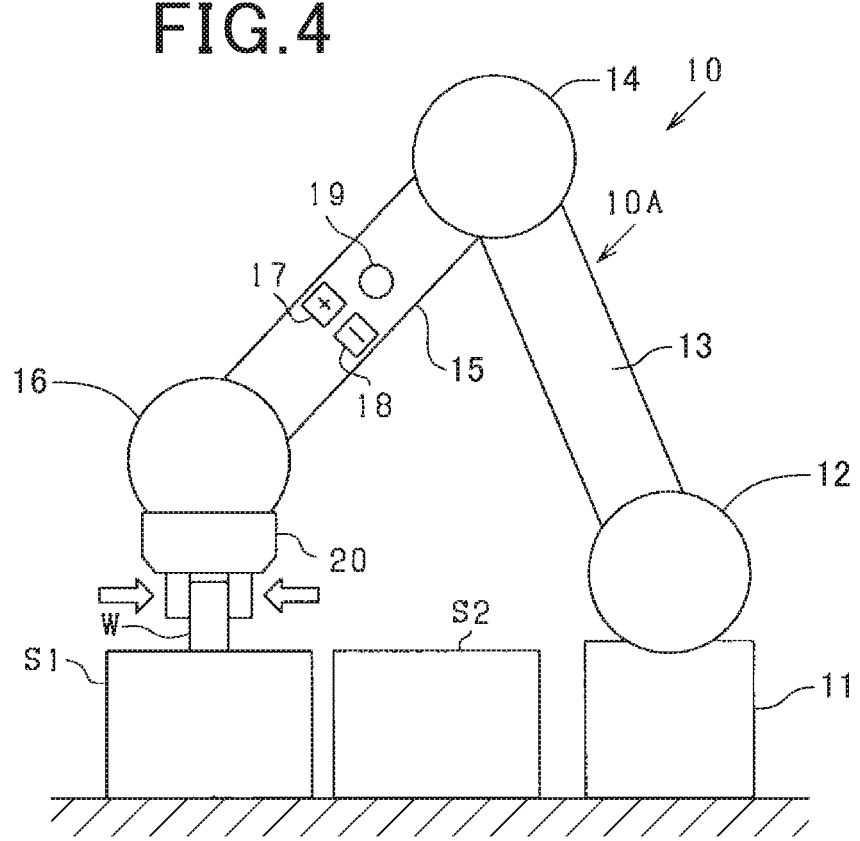
FIG. 4 is a schematic view illustrating a mode of gripping a workpiece at a pick position.

Subsequently, the workpiece W is gripped by the hand 20 (step S12). Specifically, as shown in FIG. 4, the user keeps pressing the close button 18 until the hand 20 grips the workpiece W, and stops pressing the close button 18 when an appropriate gripping force is applied to the workpiece W by the hand 20. Whether the hand 20 grips the workpiece W with an appropriate force or not may be determined by the user observing the states of the hand 20 and the workpiece W, or by the user observing the displayed gripping force, which is detected by the force sensor 23.

Subsequently, the position recording button 19 is pressed (step S13). When the position recording button 19 is pressed by the user, the control unit 36 causes the recording unit 35 to record the state information at the time when the position recording button 19 is pressed, following the previous state information. In FIG. 4, a pick position and a downward posture are recorded as the position and the posture of the arm 10A, an open/closed position corresponding to the width of the workpiece W is recorded as the open/closed position of the hand 20, a gripping force with which the workpiece W is gripped is recorded as the gripping force, and a gripping operation is recorded as the gripping state.

Figure 5:
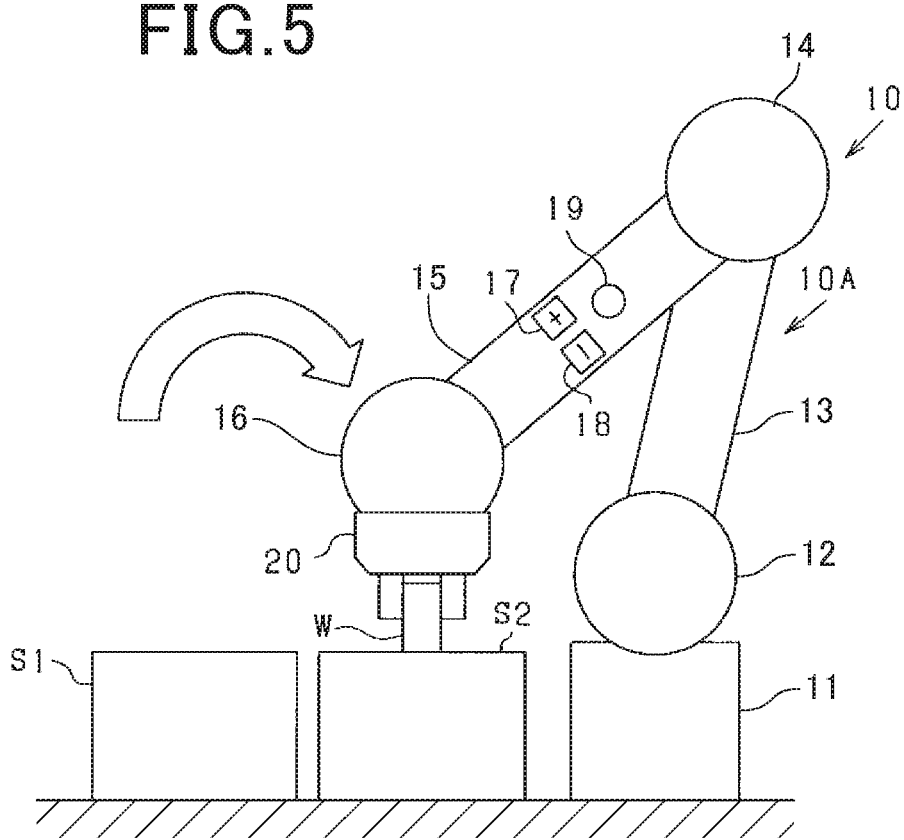
FIG. 5 is a schematic view illustrating a mode of moving to a place position.

Subsequently, the arm 10A is transferred to a place position (position at which the workpiece W is placed) (step S14). Specifically, as shown in FIG. 5, the user directly grasps the arm 10A and moves it to the place position by direct teaching. In so doing, the hand 20 maintains the state of gripping the workpiece W (gripping operation).

Subsequently, the position recording button 19 is pressed (step S15). When the position recording button 19 is pressed by the user, the control unit 36 causes the recording unit 35 to record the state information at the time when the position recording button 19 is pressed, following the previous state information. In FIG. 5, a place position and a downward posture are recorded as the position and the posture of the arm 10A, an open/closed position corresponding to the width of the workpiece W is recorded as the open/closed position of the hand 20, a gripping force with which the workpiece W is gripped is recorded as the gripping force, and a gripping operation is recorded as the gripping state.

Figure 6:
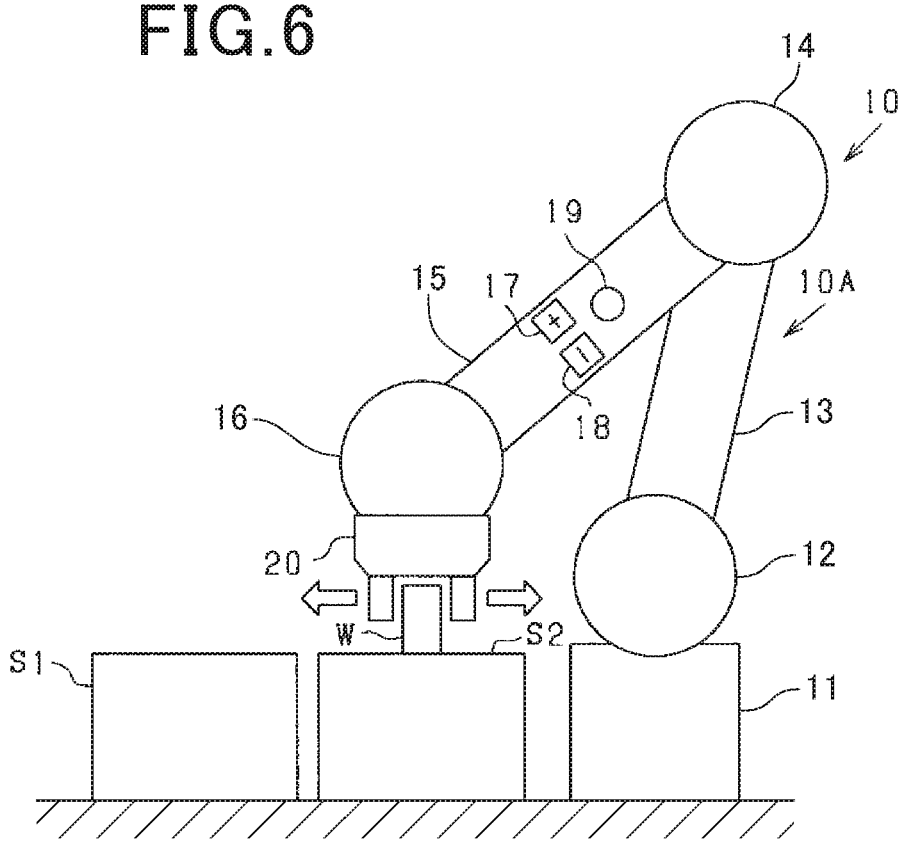
FIG. 6 is a schematic view illustrating a mode of releasing a workpiece at a place position.

Subsequently, the workpiece W is released from the hand 20 (step S16). Specifically, as shown in FIG. 6, the user keeps pressing the open button 17 until the hand 20 releases the workpiece W, and stops pressing the open button 17 when the hand 20 is opened to an appropriate width.

Subsequently, the position recording button 19 is pressed (step S17). When the position recording button 19 is pressed by the user, the control unit 36 causes the recording unit 35 to record the state information at the time when the position recording button 19 is pressed, following the previous state information. In FIG. 6, a place position and a downward posture are recorded as the position and the posture of the arm 10A, an open/closed position opened wider than the width of the workpiece W is recorded as the open/closed position of the hand 20, 0 is recorded as the gripping force, and a non-gripping operation is recorded as the gripping state. Then, this series of operations are completed (END).

FIG. 7 is a flowchart showing a procedure for reproducing the taught operations. This series of operations are performed by the control unit 36. With reference to FIGS. 3 to 6, a procedure for reproducing operations of transferring the workpiece W from the work table S1 to the work table S2 and releasing the workpiece W on the work table S2 will be described.

First, the arm 10A is moved to the recorded pick position, and the hand 20 is opened to the recorded open/closed position by a movement operation (step S20). Specifically, as shown in FIG. 3, when the gripping state of the state information is a non-gripping operation, that is, when the gripping force of the state information is smaller than the second force, the open/closed position is reproduced at the highest speed in reproduction of the state information.

Specifically, the arm 10A is on standby at the recorded pick position, and the hand 20 is closed to the recorded open/closed position until the recorded gripping force is reproduced by a gripping operation (step S21). Specifically, as shown in FIG. 4, when the gripping state of the state information is a gripping operation, that is, when the gripping force of the state information is larger than the first force, the state information is reproduced with priority to the gripping force over the open/closed position. Specifically, when the gripping force detected by the force sensor 23 (hereinafter, referred to as a "detected gripping force") becomes equal to the gripping force recorded as the state information (hereinafter, referred to as a "recorded gripping force") before the open/closed position detected by the encoder 22 (hereinafter, referred to as a "detected open/closed position") becomes equal to the open/closed position recorded as the state information (hereinafter, referred to as a "recorded open/closed position"), an operation of closing the hand 20 is stopped.

Further, when the detected open/closed position becomes equal to the recorded open/closed position but the detected gripping force does not become equal to the recorded gripping force, an operation of closing the hand 20 is continued until the detected gripping force becomes equal to the recorded gripping force. However, when the detected gripping force in reproduction of the recorded open/closed position is smaller than the recorded gripping force by more than a predetermined degree, it is determined that the hand 20 has failed to grip the workpiece W. Examples of the case where the detected gripping force is smaller than the recorded gripping force by more than a predetermined degree include the case where the detected gripping force is less than half of the recorded gripping force, or the case where the detected gripping force is 0.

Specifically, the arm 10A is moved to the recorded place position, and the gripping operation of the hand 20 is maintained until the recorded open/closed position and the gripping force are reproduced (step S22). Specifically, as shown in FIGS. 4 and 5, when the gripping states of two consecutive pieces of state information are gripping operations, that is, when the gripping forces of two consecutive pieces of state information are larger than the first force, a gripping operation is maintained as the operation of the hand 20 between the two consecutive pieces of state information. In short, the operation of the hand 20 between two consecutive pieces of state information is controlled based on the gripping forces of the two consecutive pieces of state information.

Subsequently, the arm 10A is on standby at the recorded place position, and the hand 20 is opened to the recorded open/closed position by a movement operation (step S23). Specifically, as shown in FIG. 6, when the gripping state of the state information is a non-gripping operation, that is, when the gripping force of the state information is smaller than the second force, the open/closed position is reproduced at the highest speed in reproduction of the state information. Then, this series of operations are completed (END).

The present embodiment detailed above has the following advantages.

When the position recording button 19 receives a recording operation, the recording unit 35 records the position and posture of the arm 10A, the open/closed position and gripping force of the hand 20, which are each detected by the encoders 31, 32, and 33, the encoder 22, and the force sensor 23, as the state information in time series. Accordingly, the user can record the state information including the gripping force of the hand 20 by causing the robot 10 to perform an operation of gripping the workpiece W with the hand 20 and performing an operation of recording the state by pressing the position recording button 19.

Then, the user can record the state information in time series by causing the arm 10A to perform an operation of moving and performing an operation of recording the state.

The control unit 36 controls the operations of the arm 10A and the hand 20 so as to reproduce the state information recorded in time series by the recording unit 35. Therefore, even a user who does not have special skills can easily teach and reproduce the operations of the robot 10 and the hand 20 without the need of inputting the gripping force or the like of the hand 20.

In a gripping operation by which the workpiece W is gripped by the hand 20, it is necessary to control the open/closed position of the hand 20 and to grip the workpiece W with an appropriate force. In this regard, when the gripping force of the state information is larger than the first force, which can be used to determine the gripping operation being performed by the hand 20, the control unit 36 reproduces the state information with priority to the gripping force over the open/closed position. Accordingly, in the case where the state information is the gripping operation of the hand 20, the hand 20 can reliably grip the workpiece W with an appropriate force even if the relationship between the workpiece W and the open/closed position at the time of reproduction is deviated from the recorded state information.

Even in the case where the open/closed position of the hand 20 is controlled, it is not necessary to adjust the gripping force in a non-gripping operation (movement operation of the hand 20), by which the workpiece W is not gripped by the hand 20. In this regard, when the gripping force of the state information is smaller than the second force, which can be used to determine the non-gripping operation being performed by the hand 20, the control unit 36 reproduces the open/closed position at the highest speed in reproduction of the state information. Accordingly, when the state information is the non-gripping operation of the hand 20, the open/closed position can be reproduced at the highest speed, and thus the operation time can be reduced. Further, in teaching of the operation of the hand 20, there is no need of setting the opening/closing speed of the hand 20.

An appropriate operation of the hand 20 between two consecutive pieces of state information varies depending on the gripping forces of the two consecutive pieces of state information. For example, when first state information is a gripping operation and second state information following the first state information is also a gripping operation, it can be determined that the gripping operation should be maintained between the first state information and the second state information as well. In this regard, the control unit 36 controls the operation of the hand 20 between two consecutive pieces of state information based on the gripping forces of the two consecutive pieces of state information. Specifically, when the gripping forces of two consecutive pieces of state information are larger than the first force, the control unit 36 maintains a gripping operation as the operation of the hand 20 between the two consecutive pieces of state information. Accordingly, the operation of the hand 20 between two consecutive pieces of state information can be appropriately controlled based on the gripping forces of the two consecutive pieces of state information.

There may be a case where the hand 20 fails to grip the workpiece W depending on a position and an angle of the workpiece W. In this case, even if the open/closed position of the hand 20 in the state information is reproduced, the gripping force of the detected hand 20 becomes smaller than the gripping force of the state information. In this regard, when the gripping force detected by the force sensor 23 in reproduction of the open/closed position of the state information is smaller than the gripping force of the state information by more than a predetermined degree, the control unit 36 determines that the hand 20 has failed to grip the workpiece W. Accordingly, it can be determined that the hand 20 has failed to grip the workpiece W.

The aforementioned embodiment can be implemented with the following modification. The same components as those of the above embodiment are denoted by the same reference signs, and the description thereof will be omitted.

The process of determining that the hand 20 has failed to grip the workpiece W can be omitted.

The control unit 36 may perform the following control as another example of controlling an operation of the hand 20 between two consecutive pieces of state information based on the gripping forces of the two consecutive pieces of state information. That is, when the gripping forces of two consecutive pieces of state information are smaller than the second force, which is a force for determining a non-gripping operation being performed by the hand 20, the control unit 36 may maintain a non-gripping operation as the operation of the hand 20 between the two consecutive pieces of state information.

A third speed, which is a speed of the hand 20 in a gripping operation, may be set to be lower than the first speed in the operation by the open button 17 and the second speed in the operation by the close button 18, or may be set to be equal to the first speed and the second speed.

When the gripping force of the state information is smaller than the second force, the hand 20 may also be operated at a speed slightly lower than the highest speed, a speed higher than the first speed, a speed higher than the second speed, or a speed higher than the third speed in reproduction of the state information.

Even in the case where the hand 20 grips the workpiece W, it is not necessary to adjust the gripping force before the hand 20 comes into contact with the workpiece W. Therefore, when the gripping force of the state information is larger than the first force, the control unit 36 may operate the hand at a highest speed to a position before the open/closed position by a predetermined distance in reproduction of the state information. According to this configuration, even in the case where the hand 20 grips the workpiece W, the hand 20 can be operated at a highest speed to a position before the open/closed position by a predetermined distance, the open/closed position being a position at which gripping operation ends, and thus the operation time can be reduced. In addition, the hand 20 may also be operated at a speed slightly lower than the highest speed, a speed higher than the first speed, a speed higher than the second speed, or a speed higher than the third speed to a position before the open/closed position by a predetermined distance, the open/closed position being a position at which gripping operation ends.

There may be a case where first state information is taught that the arm 10A is separated from the workpiece W and the hand 20 is not gripping the workpiece W, and second state information following the first state information is taught that the arm 10A has moved to the workpiece W and the hand 20 is gripping the workpiece W. In this case, if the hand 20 which has moved from the position of the arm 10A in the first state information closes before reaching the position of the arm 10A in the second state information, the hand 20 cannot grip the workpiece W.

Therefore, when the gripping force in first state information is smaller than the second force, and the gripping force in second state information following the first state information is larger than the first force, the control unit 36 reproduces the open/closed position and the gripping force after reproducing the position and the posture in reproduction of the second state information. According to this configuration, even if a state in which the arm 10A has moved to the workpiece W and the hand 20 is gripping the workpiece W is taught after a state in which the arm 10A is separated from the workpiece W and the hand 20 is not gripping the workpiece W is taught, the hand 20 can grip the workpiece W. Therefore, the number of pieces of state information (operation state) that are taught can be reduced, and thus teaching of operations of the robot 10 and the hand 20 can be further easily performed.

There may be a case where third state information is taught that the arm 10A has moved to the workpiece W and the hand 20 is gripping the workpiece W, and fourth state information following the third state information is taught that the arm 10A has moved from the position in the third state information and the hand 20 is not gripping the workpiece W. In this case, if the hand 20 which has moved from the position of the arm 10A in the third state information opens before reaching the position of the arm 10A in the fourth state information, the hand 20 drops the workpiece W and fails to transfer the workpiece W to the position in the fourth state information.

Therefore, when the gripping force in third state information is larger than the first force, and the gripping force in fourth state information following the third state information is smaller than the second force, the control unit 36 reproduces the open/closed position and the gripping force after reproducing the position and the posture in reproduction of the fourth state information. According to this configuration, even if a state in which the workpiece W has been moved and the hand 20 has released the workpiece W is taught after a state in which the hand 20 is gripping the workpiece W, the hand can be moved without dropping the workpiece W. Therefore, the number of pieces of state information that are taught can be reduced, and thus teaching of operations of the robot 10 and the hand 20 can be further easily performed.

The gripping operation is not limited to an operation of gripping a workpiece W from the outside thereof, and may also be an operation of gripping the workpiece W by inserting and expanding a pair of claws 20A and 20B in a cavity of the workpiece W.

The robot 10 may not be necessarily configured to move the arm 10A by direct teaching, and the arm 10A may also be moved by operating a device such as a teaching pendant (operation device).

In this case, the teaching pendant may be provided with the open button 17, the close button 18, and the position recording button 19.

The robot 10 is not limited to a vertical articulated robot, and may also be a horizontal or other types of articulated robot.

What is claimed is:

1. An industrial articulated robot comprising:
 a movable arm, the movable arm having a plurality of serially jointed links with a joint arranged between two of the links, the movable arm being configured to enable a user to manually and directly grasp one of the links of the arm and manually change a position and a posture of the arm for direct teaching of the robot, the movable arm provided with a hand on a distal end of the arm, the hand having a pair of claw portions which grip a workpiece, the claw portions being configured to open and close selectively in response to user's manual operations performed with open and close buttons arranged on a one link of the links of the arm, and the movable arm provided with a position recording button arranged on the one link of the arm on which the open and close buttons are also arranged, the user being allowed to selectively press the open and close buttons and the position recording button while the user manually and directly grasps the one link, the position recording button receiving the user's manual operations selectively performed with the open and close buttons every time the position recording button is pressed;

a recoding medium; and a controller comprising:

a first detector configured to detect the position and the posture of the arm manually operated by the user;

a second detector configured to detect an open/closed position of the claw portions in response to user's selective operations on the open and close buttons;

a third detector configured to detect a gripping force generated by the claw portions of the hand; and a processor configured to i), during the direct teaching, record into the recording medium, as state information to be recorded in time series, the position and the posture, the open/closed position where the workpiece is to be gripped, and the gripping force, which are detected by the first detector, the second detector, and the third detector, respectively, obtained every time when the user manually presses the position recording button, and ii), during a reproducing operation of the robot, control by the controller operations of the arm and the hand such that the operations of both the arm and the hand are reproduced based on the state information recorded in time series in the recording medium, wherein, in the reproducing operation of the robot, when the gripping force recorded as the state information is larger than a first force which is set to be larger than zero so as to determine that a gripping operation of the hand is being performed, the controller is configured to operate the hand so as to move the hand to a position before the open/closed position by a predetermined distance.

2. The robot according to claim 1, wherein, when, in the reproducing operation of the robot, the gripping force recorded as the state information is smaller than a second force which is set to be smaller than the first force indicating that the hand is in a non-gripping operation, the controller is configured to operate the hand to move the hand to the open/closed position recorded as the state information at the highest speed.

3. The robot according to claim 2, wherein the controller is configured to control the operation of the hand between two consecutive pieces of the state information based on gripping forces recorded as the two consecutive pieces of the state information.

4. The robot according to claim 2, wherein, when the gripping force recorded as first state information is smaller than the second force, and the gripping force recorded as second state information following the first state information is larger than the first force, the controller is configured to control the hand to reproduce the open/closed position and the gripping force after reproducing the position and the posture.

5. The robot according to claim 2, wherein, when the gripping force recorded as third state information is larger than the first force, and the gripping force recorded as fourth state information following the third state information is smaller than the second force, the controller is configured to control the hand to reproduce the open/closed position and the gripping force after reproducing the position and the posture.

6. The robot according to claim 1, wherein, in the reproducing operation of the robot, the controller is configured to control the operation of the hand between two consecutive pieces of the state information based on gripping forces recorded as the two consecutive pieces of the state information.

7. The robot according to claim 6, wherein, when the gripping forces of two consecutive pieces recorded as the state information are larger than the first force, the controller is configured to maintain the gripping operation as the operation of the hand between the two consecutive pieces recorded as the state information.

8. The robot according to claim 1, wherein, in the reproducing operation of the robot, when gripping forces of two consecutive pieces recorded as the state information are smaller than a second force, the controller is configured to maintain a non-gripping operation as the operation of the hand between the two consecutive pieces recorded as the state information.

9. The robot according to claim 1, wherein, when the gripping force detected by the third detector in reproduction of the open/closed position recorded as the state information is smaller than the gripping force recorded as the state information by a value which is more than a predetermined degree, the controller is configured to determine that the hand has failed to grip the workpiece.

10. The robot according to claim 1, wherein, the controller moves the hand at a highest speed to the position before the open/closed position.

11. The robot according to claim 1, wherein, after the movement to the position before the open/closed position, the controller causes the hand to standby at a place where the workpiece is to be placed.

12. The robot according to claim 11, wherein, after the movement to the position before the open/closed position, the claw portions of the hand are opened.

* * * * *